Patented Apr. 4, 1950

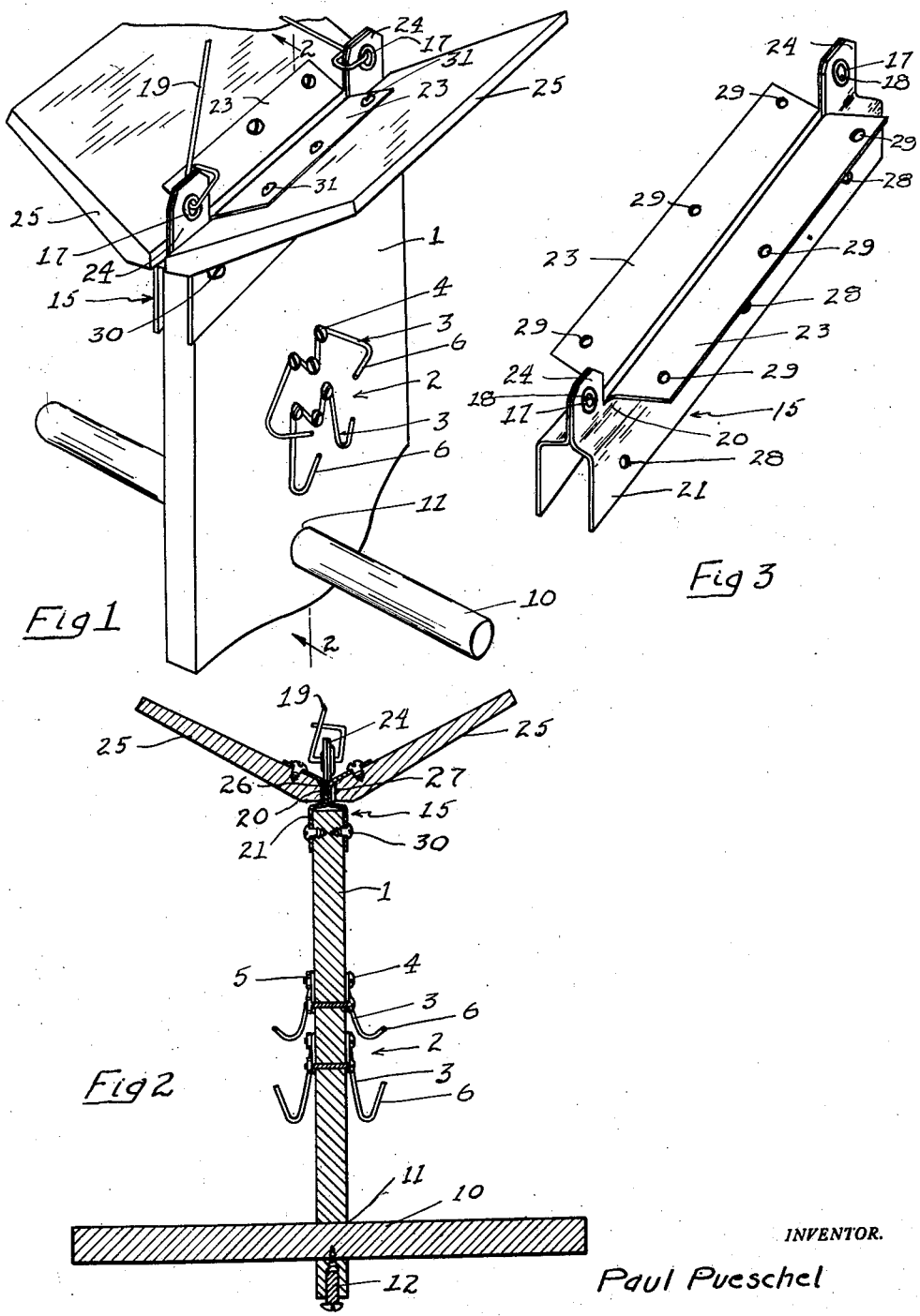

2,503,068

UNITED STATES PATENT OFFICE 2,503,068

BIRD FEEDING STATION

Paul Pueschel, Glencoe, Ill.

Application May 27, 1946, Serial No. 672,548

6 Claims. (Cl. 119—51)

This invention relates to bird feeding stations and has to do particularly with an improved feeding station of the type adapted to be suspended from a support, such as a tree or post.

An object of the invention is to provide an improved bird feeding station which is simple and rugged in construction, easy to manufacture and assemble, and which will withstand weather conditions throughout a long period of use.

Another object of the invention is to provide a bird feeding station having improved means for suspending the station and for mounting a roof relative to a food carrying member.

Another object of the invention is to provide a bird feeding station having improved suspension means which is simple and light in construction which can be readily attached to the other members forming the station and which is secured thereto in such manner that it will not become separated therefrom even after being subjected for long periods to the weight of birds and to deleterious weather conditions.

Another object of the invention is to provide a bird feeding station in which all of the fastening members which secure the several parts together are so positioned that they are in angular relation to the stresses tending to separate the several parts and thus provide high resistance to separation of the parts even after long periods of weathering of the parts.

Other objects and advantages of the invention will appear from the following description taken in connection with the appended drawings in which:

Figure 1 is a perspective view of a bird feeding station embodying my invention;

Fig. 2 is a vertical, transverse, sectional view taken through the vertical axis of the station shown in Fig. 1, and Fig. 3 is a perspective view of the suspension bracket forming a part of the structure shown in Fig. 1.

Referring now particularly to Fig. 1 there is illustrated a bird feeding station constructed in accordance with the present invention. The station includes a generally vertical body member or partition 1 of any suitable form but which preferably is formed as a generally rectangular partition or wall adapted to carry food holding means at both faces and a perch suitably positioned with respect thereto as will be explained more in detail hereinafter. The partition 1 preferably is formed of wood, and is of sufficient size and rigidity to properly support the several members associated therewith.

Secured to the partition 1 at both sides thereof are food holders of suitable construction adapted to firmly support items of bird food such as fruit, bakery products, suet, seeds, and others. In the present embodiment there is illustrated a preferred form of food holder 2 especially well adapted for supporting solid articles such as fruit, suet or the like. The food holder 2 includes a plurality of wires 3, preferably of rustless material, such as brass, each firmly attached to the partition 1, as by screws 4 secured in place by nuts 5, preferably of rustless material. Each wire 3 is extended around the shanks of the several screws, the wires on one face of the partition 1 being retained by the heads of the screws 4 and on the other face by the nuts 5. The ends of the wires 3 are free and provide prongs or hooks 6 on which small food items such as small pieces of apple may be impaled. Alternatively, two or more of the prongs 6 may together be pressed into a single large article such as a whole apple. Preferably the wires 3 are sufficiently rigid to firmly support the food but sufficiently flexible to permit them to be bent to accommodate articles of various sizes and shapes. The food holders at both sides of the partition preferably are similar although one may be of different construction than that illustrated and may take the form of a basket or dish (not shown) or the like for supporting friable, comminuted, or small items such as bread, pastry, crumbs or small seeds.

A perch 10 is supported on the partition 1 below the food holders 2 in position to permit a bird to perch thereon and reach the food carried by one or the other of the food holders. The perch 10 preferably is formed by a single wooden rod which is extended through an opening 11 formed in the body and is secured therein as by a set screw 12. The perch 10 is of such length that it projects laterally beyond opposite faces of the partition to provide adequate perching space at each side.

It is desirable that the food supported by the food holders be protected as far as practicable from the weather, without interfering with the approach of birds to the perch 10. Accordingly the station includes a roof in the form of a pair of roof members or eaves 25 which project in opposite directions outwardly and upwardly from the top of the partition 1. Angularly positioning of the roof members avoids interference with the landing of a bird from an upward angular position onto the perch.

The partition member and roof members may be formed of any suitable material, but I preferably make them from wood in order to avoid excessive cost as well as excessive weight. Naturally, since the bird feeding station, once installed, is subjected to all kinds of weather conditions there is a normal tendency for the wood to deteriorate and a problem arises as to the mode of securing together the several parts in order to insure long life and continued proper functioning of the device. To that end my invention contemplates the use of novel means for securing together the roof and partition members in such a way that the fastening means employed will securely hold the parts together notwithstanding the deterioration tendency of such parts.

In carrying out my invention in the foregoing respect, I provide a single integral bracket member 15 (Fig. 3) formed, preferably, from a light metal such as aluminum which is sufficient strong and rigid to provide adequate support, and which is sufficiently flexible so that it can be formed readily to the desired shape and which is resistant to weathering.

The bracket 15 preferably is formed by two similar plates secured together adjacent their ends by hollow rivets 17, having openings 18 therein, to form in effect, a single integral member. The suspension bracket 15 is formed with a rib-like partition body 20 of two-ply thickness which is sufficiently rigid to withstand normal bending stresses. Extending from the body 20 is a channel portion 21 shaped and dimensioned to receive snugly therein the upper edge portion of the body 1, which latter is secured in the channel 21 suitably as by generally horizontal wood screws 30. Extending laterally outward and upward from the central portion of the body 20 is a pair of flanges or wing elements 23 which preferably are formed as integral portions of the plates 16 respectively and which provide roof-receiving spaces 26 and 27 between the respective flanges and the channel 21.

The inner edges of the roof members 25 are so shaped that they fit into the openings 26 and 27 in engagement width with both the upper bottom surface of the channel 21 and the under surfaces of the wing elements 23. With the partition member and roof members engaged with the bracket member 15 in the manner described, the parts are secured together by fastening members disposed at an angle to the direction in which strains and stresses are imposed when a bird lands on the perch 10. It will readily be recognized that a bird lands with considerable force and the fastening means, according to my invention is so arranged, that this force may readily be withstood without danger of rupturing the parts and loosening of the fastening means, even though the feeding station has been in use a long period of time and subjected to all kinds of deteriorating weather conditions.

To the foregoing end the sides of the channel portion 21 are provided with longitudinal spaced openings 28 and the wing elements 23 are provided with longitudinal spaced openings 29. These openings are adapted to receive screws or other suitable fastening devices 30 and 31, respectively.

The screws in the channel member are so located that they extend at right angles to the line of thrust applied to the bracket 15 and partition member 1. The screws 31 in the wing elements 23 also extend at an angle to the line of thrust so that in all instances, where parts are attached, the fastening means are subjected to a shear action as distinguished from a strip or withdrawing action when stresses are imposed on the feeding station. This insures that the fastening devices, not withstanding deterioration of the wood members secured thereby, will firmly retain those parts connected as shown.

The feeding station is adapted to be suspended in such manner as to prevent access thereto by bird enemies or competitors for the food such as cats, dogs, rats or squirrels, and preferably it is suspended by suspension element such as a wire or cord extending from the limb of a tree or from a lateral bar extending from a tree or post. The portions of the body 20 of the bracket 15 longitudinally beyond the flanges 23 and which contain the hollow rivets 17 comprise rigid and strong two-ply suspension ears 24, the openings 18 in the rivets being suitable for receiving a suspension element such as a wire 19.

From the foregoing it will be seen that my invention provides a bird feeding station which is simple, sturdy, inexpensive to manufacture and assemble and which will withstand the deteriorating effects of weather throughout a long period of use. The screws which secure the body and roof members to the suspension member are disposed in a generally angular relation to the stresses applied thereto and hence resist any tendency to pull them out of the body and roof members when the birds alight on the station, or cats or squirrels jump at and strike the station, or when heavy winds or rains occur. Moreover, the screws will not pull out readily even when loosened by the weathering of the wood.

The suspension bracket also provides improved means for attaching the roof members and for retaining them in the desired position. Any tendency for the room members to sag, causes the beveled edges to be wedged more firmly in their seats formed by the body and flanges of the suspension bracket. On the other hand, any force such as a side wind, which may tend to bend the roof members upwardly is resisted by the long flange members and by the bearing of the edges of the roof members against the body of the suspension bracket. Since the roof members are in effect wedged in their respective seats by their own weight, little if any strain is placed on the screws which secure the roof members to the flanges of the suspension bracket.

The perch is attached to the body of the feeding station in such manner that it will resist any stresses likely to be placed on it. Moreover, since it depends primarily upon its seating in the body to retain it in place, any weathering of the respective parts will not loosen the perch in its seat to such an extent that it will pull out.

The novel food holding arrangement is simple and easy to assemble and is resistant to deterioration due to weathering. The holders can be used to support numerous types of food items and, as explained hereinbefore can be used with either a number of small items each individually supported on a single prong, or can be used in various combinations to support relatively large articles. Since several prongs may be used and may be suitably bent to firmly engage the food, it will not readily become dislodged even when vigorously attacked by the birds or when partially consumed.

I claim:

1. A bird feeding station comprising, a single, vertical partition member, a food holder supported on said partition member, a perch extending from opposite sides of said partition member below said food holder, a roof member, and a suspension bracket having a body enclosing the top of said partition member, said body having downwardly extending portions secured to each side of said partition member, suspension portions, each adapted to engage a suspension element, and a flange portion above said body and said partition member and mounting said roof member above said food holder.

2. A bird feeding station comprising, a single, vertical body member, a roof member extending laterally from said body member, a suspension bracket having a generally vertical channel portion extending along and receiving the top edge of said body member, and a generally lateral channel portion extending along said roof member and above said body member, and means securing said body member and said roof member to said vertical and lateral portions of said suspension member respectively.

3. A bird feeding station comprising, a single, vertical wall member, a roof member extending laterally from said wall member, and a suspension member having a plurality of generally channel shaped portions for receiving and securing the upper edge portion of said wall member and the inner edge of said roof member, and a suspension ear upstanding from said channel portion.

4. A bird feeding station comprising a single, vertically disposed partition member providing opposed feeding faces, perch means carried by the lower portion of said partition member and having perch surfaces extending adjacent each of said feeding faces, a pair of roof members disposed at the upper edge of said partition member and extending upwardly and outwardly therefrom in shielding relation to said feeding faces and a single, integral support-suspension member for mounting and suspending said partition member and roof members and including a vertically disposed channel element adapted to receive and to be secured to the upper portion of said partition member, and from which the latter is vertically suspended, a pair of angularly disposed wing elements each projecting upwardly and outwardly from said support-suspension member and forming parallel channels above said vertical channel with each wing element adapted to be secured to one of said roof members, and a pair of spaced, vertically-disposed suspension elements at the opposite ends of said wing elements and having openings adapted to receive means for suspending the feeding station from a suitable support.

5. A bird feeding station comprising a single, vertically disposed partition member providing opposed feeding faces, perch means carried by the lower portion of said partition member and having perch surfaces extending adjacent each of said feeding faces, a pair of roof members disposed at the upper edge of said partition member and extending upwardly and outwardly therefrom in shielding relation to said feeding faces, and a single member having three parallel channel portions, each of said portions being separately connected to said partition and to said roof members respectively for mounting and suspending them in the relation defined and having laterally spaced elements adapted to receive means for suspending the feeding station with the parts in the relation stated.

6. A bird feeding station comprising a single, vertically disposed partition member providing opposed feeding faces, perch means carried by the lower portion of said partition member and having perch surfaces extending adjacent each of said feeding faces, a pair of roof members disposed at the upper edge of said partition member and extending upwardly and outwardly therefrom in shielding relation to said feeding faces, and a single member separately connected to said partition and to each of said roof members for mounting and suspending them in the relation defined and having laterally spaced elements adapted to receive means for suspending the feeding station with the parts in the relation stated, and fastening devices to secure said partition member and said roof members to said single mounting member and disposed so as to be subjected to shear action as distinguished from a withdrawing or strip action.

PAUL PUESCHEL.

REFERENCES CITED

The following references are of record in the file of this patent:

UNITED STATES PATENTS

| Number | Name | Date |
|---|---|---|
| 581,120 | Johnson | Apr. 20, 1897 |
| 1,343,093 | Shoultz | June 8, 1920 |
| 1,653,769 | Johnson | Dec. 27, 1927 |
| 1,920,536 | Vahlkamp | Aug. 1, 1933 |
| 2,230,058 | Hornung | Jan. 28, 1941 |
| 2,306,312 | Hyde | Dec. 22, 1942 |
| 2,392,532 | Hyde | Jan. 8, 1946 |